US010443616B2

United States Patent
McCaffrey

(10) Patent No.: US 10,443,616 B2
(45) Date of Patent: Oct. 15, 2019

(54) BLADE OUTER AIR SEAL WITH CENTRALLY MOUNTED SEAL ARC SEGMENTS

(71) Applicant: United Technologies Corporation, Farmington, CT (US)

(72) Inventor: Michael G. McCaffrey, Windsor, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 1004 days.

(21) Appl. No.: 15/071,263

(22) Filed: Mar. 16, 2016

(65) Prior Publication Data

US 2017/0268361 A1    Sep. 21, 2017

(51) Int. Cl.
| | | |
|---|---|---|
| *F01D 11/12* | (2006.01) | |
| *F04D 29/52* | (2006.01) | |
| *F04D 29/32* | (2006.01) | |
| *F04D 29/08* | (2006.01) | |
| *F01D 25/24* | (2006.01) | |

(52) U.S. Cl.
CPC ............ *F04D 29/526* (2013.01); *F01D 11/12* (2013.01); *F01D 25/246* (2013.01); *F04D 29/083* (2013.01); *F04D 29/324* (2013.01); *F05D 2220/32* (2013.01); *F05D 2230/60* (2013.01); *F05D 2240/11* (2013.01); *F05D 2260/941* (2013.01); *Y02T 50/672* (2013.01)

(58) Field of Classification Search
CPC .......... F01D 11/08; F01D 11/12; F01D 25/24; F01D 5/02; F04D 29/083; F04D 29/526; F05D 2240/11; F05D 2260/941; F05D 2230/60; F05D 2220/32

See application file for complete search history.

(56) References Cited

U.S. PATENT DOCUMENTS

| | | | |
|---|---|---|---|
| 4,087,199 A | 5/1978 | Hemsworth et al. | |
| 4,527,385 A | 7/1985 | Jumelle et al. | |
| 4,728,257 A | 3/1988 | Handschuh | |
| 5,593,278 A | 1/1997 | Jourdain et al. | |
| 5,609,469 A | 3/1997 | Worley et al. | |
| 5,639,210 A | 6/1997 | Carpenter et al. | |
| 6,142,731 A | 11/2000 | Dewis et al. | |
| 6,431,825 B1 | 8/2002 | McLean | |

(Continued)

FOREIGN PATENT DOCUMENTS

| | | |
|---|---|---|
| EP | 2357322 | 8/2011 |
| EP | 2960440 | 12/2015 |

(Continued)

OTHER PUBLICATIONS

European Search Report for European Patent Application No. 17160057 completed Aug. 30, 2017.

*Primary Examiner* — Eldon T Brockman
(74) *Attorney, Agent, or Firm* — Carlson, Gaskey & Olds, P.C.

(57) ABSTRACT

A seal system includes a segmented annular seal support that has carriage arc segments arranged circumferentially in circumferential carriage joints, and a segmented annular seal that includes seal arc segments arranged end-to-end in circumferential seal joints. The circumferential seal joints are circumferentially offset from the circumferential carriage joints.

19 Claims, 4 Drawing Sheets

(56) References Cited

U.S. PATENT DOCUMENTS

| | | | |
|---|---|---|---|
| 6,726,448 B2 | 4/2004 | McGrath et al. | |
| 6,733,235 B2 | 5/2004 | Alford et al. | |
| 7,052,235 B2 | 5/2006 | Alford et al. | |
| 7,163,206 B2 | 1/2007 | Cross et al. | |
| 7,435,049 B2 | 10/2008 | Ghasripoor et al. | |
| 7,527,472 B2 | 5/2009 | Allen | |
| 7,959,407 B2 | 6/2011 | Tholen | |
| 8,079,807 B2 * | 12/2011 | Shapiro | F01D 25/246 415/173.1 |
| 8,123,466 B2 | 2/2012 | Pietraszkiewicz et al. | |
| 8,303,247 B2 | 11/2012 | Schlichting et al. | |
| 8,439,636 B1 | 5/2013 | Liang | |
| 8,534,995 B2 | 9/2013 | McCaffrey | |
| 8,568,091 B2 | 10/2013 | McCaffrey | |
| 8,585,357 B2 | 11/2013 | DiPaola et al. | |
| 8,596,963 B1 | 12/2013 | Liang | |
| 8,790,067 B2 | 7/2014 | McCaffrey et al. | |
| 8,876,458 B2 | 11/2014 | Thibodeau et al. | |
| 8,920,127 B2 | 12/2014 | McCaffrey | |
| 8,944,756 B2 | 2/2015 | Lagueux | |
| 9,039,358 B2 | 5/2015 | Tholen et al. | |
| 9,115,596 B2 | 8/2015 | Clouse | |
| 9,169,739 B2 | 10/2015 | Mironets et al. | |
| 9,200,530 B2 | 12/2015 | McCaffrey | |
| 9,228,447 B2 | 1/2016 | McCaffrey | |
| 9,458,726 B2 * | 10/2016 | Lamusga | F01D 11/08 |
| 9,938,846 B2 * | 4/2018 | Freeman | F01D 11/08 |
| 2005/0238477 A1 | 10/2005 | Arraitz et al. | |
| 2005/0271505 A1 * | 12/2005 | Alford | F01D 9/04 415/173.1 |
| 2006/0038358 A1 | 2/2006 | James | |
| 2008/0211192 A1 | 9/2008 | Pietraszkiewicz et al. | |
| 2009/0096174 A1 | 4/2009 | Spangler et al. | |
| 2009/0169368 A1 | 7/2009 | Schlichting et al. | |
| 2009/0208322 A1 | 8/2009 | McCaffrey | |
| 2010/0226760 A1 | 9/2010 | McCaffrey | |
| 2011/0044803 A1 | 2/2011 | Di Paola et al. | |
| 2011/0044804 A1 | 2/2011 | DiPaola et al. | |
| 2011/0189009 A1 * | 8/2011 | Shapiro | F01D 11/12 415/209.3 |
| 2012/0195743 A1 | 8/2012 | Walunj et al. | |
| 2012/0275898 A1 | 11/2012 | McCaffrey et al. | |
| 2013/0017057 A1 | 1/2013 | Lagueux | |
| 2013/0022469 A1 | 1/2013 | McCaffrey | |
| 2013/0113168 A1 | 5/2013 | Lutjen et al. | |
| 2013/0209240 A1 | 8/2013 | McCaffrey | |
| 2014/0016761 A1 | 1/2014 | Werner | |
| 2014/0017072 A1 | 1/2014 | McCaffrey | |
| 2014/0023480 A1 | 1/2014 | McCaffrey | |
| 2014/0033149 A1 | 1/2014 | Groves et al. | |
| 2014/0044528 A1 | 2/2014 | Clouse | |
| 2014/0053040 A1 | 2/2014 | Hargan | |
| 2014/0127006 A1 | 5/2014 | Romanov et al. | |
| 2014/0133955 A1 | 5/2014 | McCaffrey et al. | |
| 2014/0186152 A1 | 7/2014 | McCaffrey et al. | |
| 2015/0016954 A1 | 1/2015 | Thibodeau et al. | |
| 2015/0031764 A1 | 1/2015 | Kraus et al. | |
| 2015/0226132 A1 | 8/2015 | Thill et al. | |
| 2015/0337672 A1 | 11/2015 | McCaffrey et al. | |
| 2015/0369076 A1 | 12/2015 | McCaffrey et al. | |
| 2015/0377050 A1 * | 12/2015 | Freeman | F01D 11/08 416/185 |
| 2016/0003078 A1 | 1/2016 | Stevens et al. | |
| 2016/0003080 A1 | 1/2016 | Mcgarrah | |

FOREIGN PATENT DOCUMENTS

| | | |
|---|---|---|
| WO | 2015038906 | 3/2015 |
| WO | 2015047478 | 4/2015 |
| WO | 2015061108 | 4/2015 |
| WO | 2015088656 | 6/2015 |
| WO | 2015109292 | 7/2015 |
| WO | 2015112354 | 7/2015 |
| WO | 20150138027 | 9/2015 |

* cited by examiner

BLADE OUTER AIR SEAL WITH CENTRALLY MOUNTED SEAL ARC SEGMENTS

BACKGROUND

A gas turbine engine typically includes at least a compressor section, a combustor section and a turbine section. The compressor section pressurizes air into the combustion section where the air is mixed with fuel and ignited to generate an exhaust gas flow. The exhaust gas flow expands through the turbine section to drive the compressor section and, if the engine is designed for propulsion, a fan section.

The turbine section may include multiple stages of rotatable blades and static vanes. An annular shroud or blade outer air seal may be provided around the blades in close radial proximity to the tips of the blades to reduce the amount of gas flow that escapes around the blades. The shroud typically includes a plurality of arc segments that are circumferentially arranged. The arc segments may be abradable to reduce the radial gap with the tips of the blades.

SUMMARY

A seal system according to an example of the present disclosure includes a segmented annular seal support that has carriage arc segments arranged circumferentially in circumferential carriage joints, and a segmented annular seal that has seal arc segments arranged end-to-end in circumferential seal joints. The circumferential seal joints are circumferentially offset from the circumferential carriage joints.

In a further embodiment of any of the foregoing embodiments, the segmented annular seal support includes a number X of the carriage arc segments. The segmented annular seal includes a number Y of the seal arc segments, and the number X equals the number Y.

In a further embodiment of any of the foregoing embodiments, each circumferential seal joint is approximately circumferentially centered between two of the circumferential carriage joints.

In a further embodiment of any of the foregoing embodiments, each of the carriage arc segments includes respective circumferential carriage ends and a respective support member circumferentially intermediate the respective circumferential carriage ends. The support member radially support two of the seal arc segments.

In a further embodiment of any of the foregoing embodiments, the support member supports each of the two of the seal arc segments in a respective ramped interface such that each of the two of the seal arc segments is circumferentially moveable.

In a further embodiment of any of the foregoing embodiments, each of the carriage arc segments includes a respective second spring member radially biasing both of the two of the seal arc segments.

In a further embodiment of any of the foregoing embodiments, each of the carriage arc segments includes a radially inner side wall, first and second axial side walls that extend radially-outwardly from the radially inner side wall, and a third axial side wall that extends radially-inwardly from the radially inner side wall.

In a further embodiment of any of the foregoing embodiments, the radially inner side wall defines a periphery and rails located at the periphery.

In a further embodiment of any of the foregoing embodiments, the first and second axial side walls include at least one hook support.

In a further embodiment of any of the foregoing embodiments, the circumferential offset between the circumferential seal joints and the circumferential carriage joints define tortuous passages between a radially inner side of the segmented annular seal and a radially outer side of the segmented annular seal support.

A gas turbine engine according to an example of the present disclosure includes a rotor section that has a rotor with a plurality of blades and at least one annular seal system circumscribing the rotor. The annular seal assembly includes a segmented annular seal support including carriage arc segments arranged circumferentially in circumferential carriage joints, and a segmented annular seal including seal arc segments arranged end-to-end in circumferential seal joints. The circumferential seal joints are circumferentially offset from the circumferential carriage joints.

In a further embodiment of any of the foregoing embodiments, the segmented annular seal support includes a number X of the carriage arc segments. The segmented annular seal includes a number Y of the seal arc segments, and the number X equals the number Y.

In a further embodiment of any of the foregoing embodiments, each circumferential seal joint is approximately circumferentially centered between two of the circumferential carriage joints.

In a further embodiment of any of the foregoing embodiments, each of the carriage arc segments includes respective circumferential carriage ends and a respective support member circumferentially intermediate the respective circumferential carriage ends. The support member radially supporting two of the seal arc segments.

In a further embodiment of any of the foregoing embodiments, the support member supports each of the two of the seal arc segments in a respective ramped interface such that each of the two of the seal arc segments is circumferentially moveable.

A method of assembling a seal system according to an example of the present disclosure includes mounting a segmented annular seal support in a gas turbine engine. The segmented annular seal support includes carriage arc segments arranged circumferentially in circumferential carriage joints. A segmented annular seal is mounted into the engine. The segmented annular seal includes seal arc segments arranged end-to-end in circumferential seal joints. The mounting includes axially inserting each of the seal arc segments into the segmented annular seal support such that the circumferential seal joints are circumferentially offset from the circumferential carriage joints.

In a further embodiment of any of the foregoing embodiments, the axial inserting includes moving each of the seal arc segments into the segmented annular seal until the seal arc segment abuts adjacent axial side walls of two of the carriage arc segments.

In a further embodiment of any of the foregoing embodiments, the mounting of the segmented annular seal support in the gas turbine engine includes hanging each of the carriage arc segments on a case structure of the gas turbine engine.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
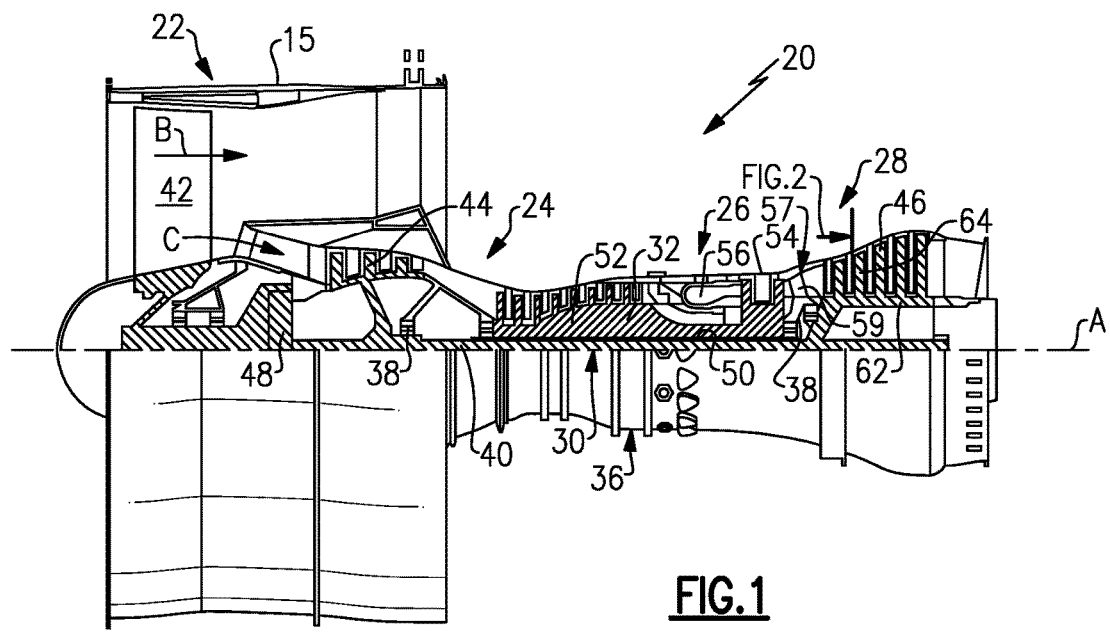
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engine designs can include an augmentor section (not shown) among other systems or features.

The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, the examples herein are not limited to use with two-spool turbofans and may be applied to other types of turbomachinery, including direct drive engine architectures, three-spool engine architectures, and ground-based turbines.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48, to drive the fan 42 at a lower speed than the low speed spool 30.

The high speed spool 32 includes an outer shaft 50 that interconnects a second (or high) pressure compressor 52 and a second (or high) pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports the bearing systems 38 in the turbine section 28. The inner shaft 40 and the outer shaft 50 are concentric and rotate via bearing systems 38 about the engine central longitudinal axis A, which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines, including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } ^\circ \text{R})/(518.7^\circ \text{R})]^{0.5}$. The "Low corrected fan tip speed" as disclosed herein according to one non-limiting embodiment is less than about 1150 ft/second.

Figure 2:
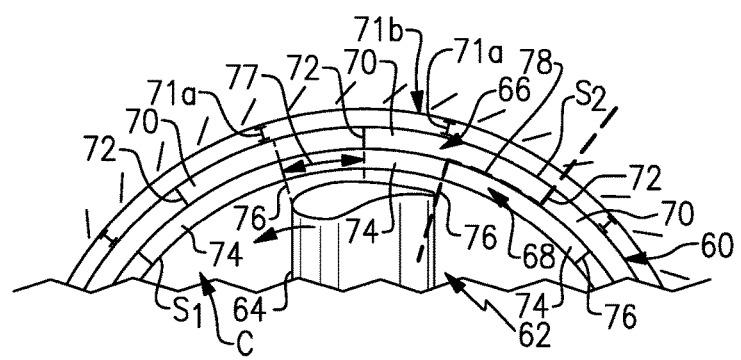
FIG. 2 illustrates an axial view of a seal assembly of a gas turbine engine.

FIG. 2 illustrates a partial axial view through a portion of one of the stages of the turbine section 28. In this example, the turbine section 28 includes an annular blade outer air seal (BOAS) system or assembly 60 (hereafter BOAS 60) that is located radially outwards of a rotor 62 that has a row of rotor blades 64. The BOAS 60 is in close radial proximity to the tips of the blades 64, to reduce the amount of gas flow that escapes around the blades 64. As can be appreciated, the BOAS 60 can alternatively or additionally be adapted for other portions of the engine 20, such as the compressor section 24.

The BOAS 60 includes a segmented annular seal support 66 that retains a segmented annular seal 68. The segmented annular seal support 66 includes a plurality of carriage arc segments 70 that are arranged circumferentially in circumferential carriage joints 72. For instance, the ends of the carriage arc segments 70 may or may not contact each other in the circumferential carriage joints 72 or there may be other circumferentially intervening structures in the circumferential carriage joints 72. Each carriage arc segment 70 may be mounted through one or more connections 71a to a case structure 71b.

The segmented annular seal 68 includes a plurality of seal arc segments 74 arranged end-to-end in circumferential seal joints 76. The circumferential seal joints 76 are circumferentially offset from the circumferential carriage joints 72, as represented at 77. The circumferential offsets between the circumferential seal joints 76 and the circumferential carriage joints 72 define tortuous passages 78 between a radially inner side S1 of the segmented annular seal 68 and a radially outer side S2 of the segmented annular seal support 66. The tortuous passages 78 serve as labyrinth seals in the BOAS 60 to reduce leakage flow through the BOAS 60 from the core airflow path C.

Figure 3:
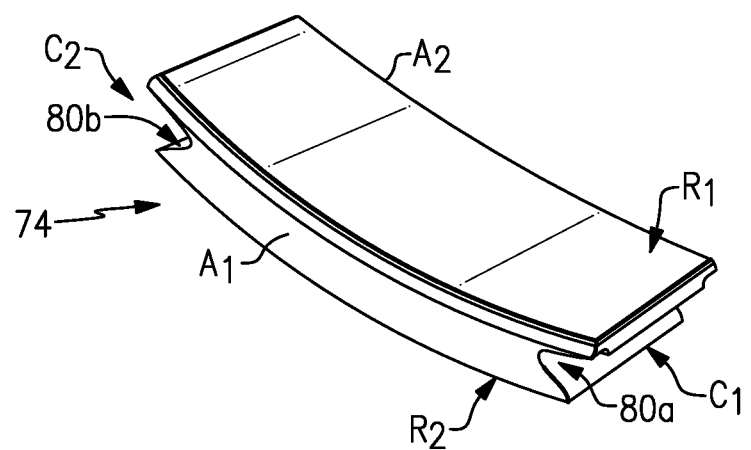
FIG. 3 illustrates an isolated view of a seal arc segment of a seal system.
Figure 4:
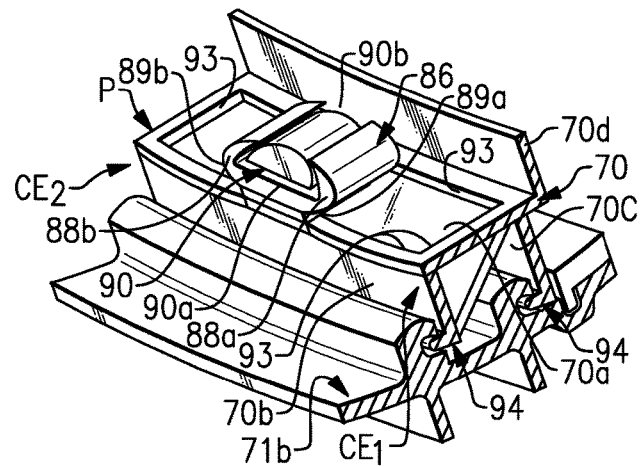
FIG. 4 illustrates an isolated view of a carriage arc segment.

FIG. 3A illustrates an isolated view of a representative one of the seal arc segments 74, and FIG. 4 illustrates a sectioned view of the carriage arc segment 70. As will be appreciated, the examples herein may be used to provide compliant, low-stress mounting of the seal arc segments 74 in the segmented annular seal support 66. In particular such compliant low-stress mounting may be useful for seal arc segments 74 formed of materials that are sensitive to stress concentrations, although this disclosure is not limited and other types of seals and materials will also benefit.

Although not limited, the seal arc segments 74 (i.e., the body thereof) may be monolithic bodies that are formed of a high thermal-resistance, low-toughness material. For example, the seal arc segments 74 may be formed of a high thermal-resistance low-toughness metallic alloy or a ceramic-based material, such as a monolithic ceramic or a ceramic matrix composite. One example of a high thermal-resistance low-toughness metallic alloy is a molybdenum-based alloy. Monolithic ceramics may be, but are not limited to, silicon carbide (SiC) or silicon nitride ($Si_3N_4$). Alternatively, the seal arc segments 74 may be formed of high-toughness material, such as but not limited to metallic alloys.

Each seal arc segment 74 is a body that defines radially inner and outer sides R1/R2, first and second circumferential ends C1/C2, and first and second axial sides A1/A2. The radially inner side R1 faces in a direction toward the engine central axis A and is thus the gas path side of the seal arc segment 74 that bounds a portion of the core flow path C. The first axial side A1 faces in a forward direction toward the front of the engine 20 (i.e., toward the fan 42), and the second axial side A2 faces in an aft direction toward the rear of the engine 20 (i.e., toward the exhaust end).

In this example, the first and second circumferential ends C1/C2 define, respectively, first and second seal supports 80a/80b by which the carriage arc segments 70 radially support or suspend the seal arc segments 74. The seal arc segment 74 is thus end-mounted. In the example shown, the first and second seal supports 80a/80b have a dovetail geometry. The seal arc segment 74 also includes a cavity 82 that is located circumferentially intermediate the first and second seal supports 80a/80b. In this example, one or more ribs 83 subdivide the cavity 82. The ribs 83 may structurally reinforce the seal arc segment 74 and/or be used to facilitate cooling.

FIG. 4 illustrates a representative one of the carriage arc segments 70. The carriage arc segment 70 spans circumferentially between first and second circumferential carriage ends CE1/CE2 and includes a support member 86 circumferentially intermediate the respective circumferential carriage ends CE1/CE2. In this example, the support member 86 includes circumferentially-spaced arms 88a/88b. The arms 88a/88b carry, respectively, ramped outer sides 89a/89b that serve as support surfaces for the seal arc segments 74. The arms 88a/88b defines a cavity 90 there between. The cavity 90 is bound circumferentially by the arms 88a/88b, but has an open axial side 90a and an open radially inner side 90b. A wedge seal 91 is disposed at least partially in the cavity 90. The geometry of the cavity 90 corresponds to the geometry of the wedge seal 91, but the cavity 90 is slightly larger to permit axial insertion of the wedge seal 91. The arms 88a/88b radially retain the wedge seal 91 in the cavity 90.

The body of the carriage arc segment 70 is formed of a radially inner side wall 70a, first and second axial side walls 70b/70c that extend radially-outwardly from the radially inner side wall 70a, and a third axial side wall 70d that extends radially-inwardly from the radially inner side wall 70a. In this example, the radially inner side wall 70a defines a periphery (P) and rails 93 located at the periphery. The rails 93 circumscribe the radially inner side wall 70a and serve as secondary load transfer features if there is a blade 64 fracture event. For example, upon fracture of a blade 64, the blade 64 contacts the seal arc segment 74 on the flowpath surface R1 and applies a large radial load onto the seal arc segment 74, pushing the seal arc segment 74 radially outward onto the rails 93. The rails 93 catch and transmit the load of the seal arc segment 74 so that the load is distributed and transferred through the carriage arc segment 70 to the case structure 71b.

In this example, the first axial side wall 70b, the second axial side wall 70c, or both, include a hook support 94. In the example shown, both the first and second axial side walls 70b/70c include such hook supports 94. The hook supports 94 serve as the connections 71a that mount the carriage arc segment 70 to a case structure 71b.

The support member 86 extends generally radially-inwardly from the radially inner side wall 70a. For example, the support member 86 can be integrally formed with the radially inner side wall 70a. More typically however, the support member 86 is a separate piece that is secured or fastened to the radially inner side wall 70a. In the example shown, the support member 86 is located in the central one-third of the carriage arc segment 70. In a further example, the support member 86 is located mid-way between the circumferential carriage ends CE1/CE2. Thus, if the BOAS 60 is used in conjunction with an active clearance control system (e.g., see FIG. 5) that is configured to adjust the relative radial position of the carriage arc segments 70 with respect to the case structure 71b, the support member 86 moves in a pure radial direction to adjust the radial proximity of the seal arc segments 74 with respect to the tips of the blades 64

Figure 5:
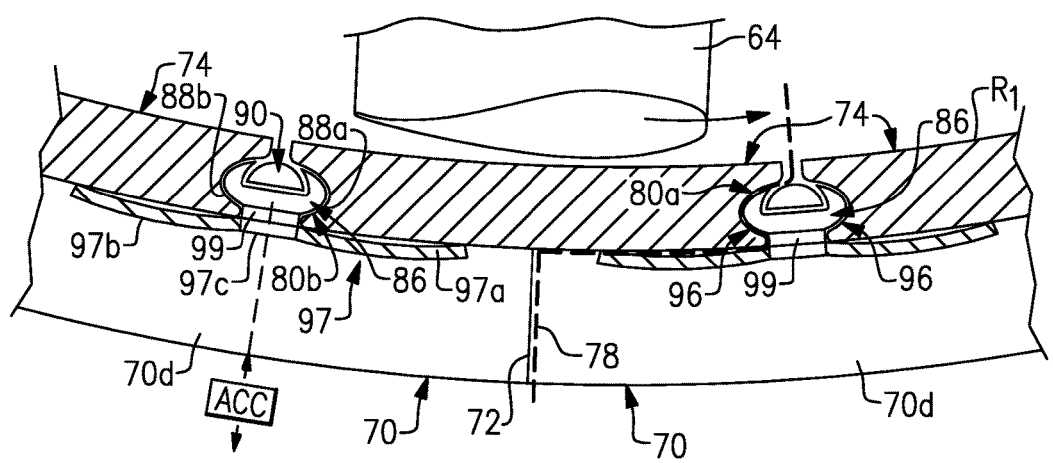
FIG. 5 illustrates several adjacent carriage arc segments and several adjacent seal arc segments mounted on the carriage arc segments.

FIG. 5 illustrates a sectioned view through several adjacent carriage arc segments 70 and several adjacent seal arc segments 74 mounted on the carriage arc segments 70. As shown, each of the support members 86 supports two of the seal arc segments 74 in respective ramped interfaces 96. For instance, each of the ramped interfaces 96 includes at least one ramped surface on the seal arc segment 74, the support member 86, or both. In the example shown, the surfaces of the first and second seal supports 80a/80b and the surfaces of the support members 86 are ramped. The term "ramped" as used herein refers to a support surface that is sloped with respect to both the radial and circumferential directions. The seal arc segments 74 can circumferentially slide at the ramped interfaces 96 and thus each seal arc segment 74 is circumferentially moveable.

The ramped interfaces 96 permit the seal arc segments 74 to move circumferentially with respect to the carriage arc segments 70 as the seal arc segments 74 slide up and down the ramped interfaces 96. Friction in the ramped interfaces 96 during sliding movement can potentially provide damping, and the relatively large contact area across the ramped interfaces 96 distributes loads transferred through the ramped interfaces 96, which also serves to potentially reduce stress concentrations on the seal arc segments 74.

To facilitate maintaining the seal arc segments 74 in a centered position, the BOAS 60 may further include one or more springs 97. For example, the spring 97 includes first and second arms 97a/97b that extend in opposed circumferential directions from a central spring portion 97c. The central spring portion 97c is mounted concentric with the support member 86, such as on a common fastener or post, which is rigidly fixed with the carriage arc segment 70 or other static structure. The first and second arms 97a/97b react or bend from the central spring portion 97c to exert a radial bias force, respectively, on the two adjacent seal arc segments 74. The radial bias force, applied evenly to the circumferential ends C1/C2 of the seal arc segments 74, tends to cause the seal arc segments 74 to slide on the ramped interfaces 96 toward a circumferentially centered position if or when the seal arc segments 74 are off-center. The spring 97 thus serves as a self-centering feature. Optionally, one or more circumferential springs 99 may be mounted concentrically with the support member 86 to circumferentially bias, respectively, the two adjacent seal arc segments 74.

Figure 6:
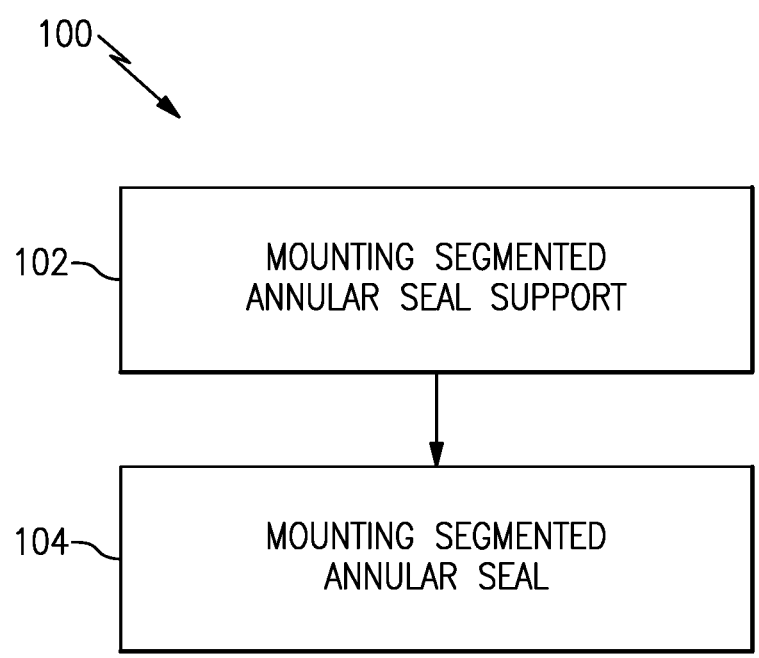
FIG. 6 illustrates a method of assembling a seal system.

FIG. 6 illustrates an example method 100 of assembling the BOAS 60. The method 100 includes mounting 102 the segmented annular seal support 66 in the gas turbine engine 20, and mounting 104 the segmented annular seal 68 into the gas turbine engine 20. The mounting 102 may include hanging each of the carriage arc segments 70 on the case structure 71b via the connections 71a, such via the hook supports 94. The mounting 104 may include axially inserting each of the seal arc segments 74 into the segmented annular seal support 66 such that the circumferential seal joints 76 are circumferentially offset from the circumferential carriage joints 72. In a further example, the axial inserting of the seal arc segments 74 includes moving each of the seal arc segments 74 into the segmented annular seal support 66 until the seal arc segment 74 abuts adjacent axial side walls 70d of two of the carriage arc segments 70. For instance, with reference to FIG. 4, the seal arc segment 74 may be axially inserted from the axially front side (e.g., at 70b) such that the seal support 80a slides axially into position adjacent the ramped outer sides 89b of the support member 86. Likewise, at the same time, the seal support 80b slides axially into position adjacent the ramped outer sides 89a of the next, adjacent support member 86. The seal arc segment 74 is slid axially until it abuts the axial side walls 70d of two of the carriage arc segments 70, which act as an axial stop for properly positioning the seal arc segment 74. Either before or after insertion of the seal arc segment 74, the wedge seal 91 may be axially slid into the cavity 90. To remove or replace one of the seal arc segments 74, the seal arc segment 74 is slid axially out from between the support members 86, and a new seal arc segment 74 is inserted.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A seal system comprising:
a segmented annular seal support including carriage arc segments arranged circumferentially in circumferential carriage joints; and
a segmented annular seal including seal arc segments arranged end-to-end in circumferential seal joints, wherein the circumferential seal joints are circumferentially offset from the circumferential carriage joints,
wherein each of the carriage arc segments includes respective circumferential carriage ends and a respective support member circumferentially intermediate the respective circumferential carriage ends, the support member radially supporting two of the seal arc segments, and each of the carriage arc segments includes a respective spring member on the respective support member radially biasing both of the two of the seal arc segments.

2. The seal system as recited in claim 1, wherein the segmented annular seal support includes a number X of the carriage arc segments, the segmented annular seal includes a number Y of the seal arc segments, and the number X equals the number Y.

3. The seal system as recited in claim 1, wherein each circumferential seal joint is approximately circumferentially centered between two of the circumferential carriage joints.

4. The seal system as recited in claim 1, wherein the support member supports each of the two of the seal arc segments in a respective ramped interface such that each of the two of the seal arc segments is circumferentially moveable.

5. The seal system as recited in claim 1, wherein each of the carriage arc segments includes a radially inner side wall, first and second axial side walls that extend radially-outwardly from the radially inner side wall, and a third axial side wall that extends radially-inwardly from the radially inner side wall.

6. The seal system as recited in claim 5, wherein the radially inner side wall defines a periphery and rails located at the periphery.

7. The seal system as recited in claim 5, wherein the first and second axial side walls include at least one hook support.

8. The seal system as recited in claim 1, wherein the circumferential offset between the circumferential seal joints and the circumferential carriage joints define tortuous passages between a radially inner side of the segmented annular seal and a radially outer side of the segmented annular seal support.

9. The seal system as recited in claim 1, wherein the spring member includes first and second arms that extend in opposed circumferential directions from a central spring portion, the first arm radially biasing one of the two of the seal arc segments and the second arm radially biasing the other the two seal arc segments.

10. The seal system as recited in claim 9, wherein the central spring portion is concentric with the support member.

11. A gas turbine engine comprising:
a rotor section including a rotor having a plurality of blades and at least one annular seal system circumscribing the rotor, the annular seal assembly comprising:
a segmented annular seal support including carriage arc segments arranged circumferentially in circumferential carriage joints, and
a segmented annular seal including seal arc segments arranged end-to-end in circumferential seal joints, wherein the circumferential seal joints are circumferentially offset from the circumferential carriage joints,
wherein each of the carriage arc segments includes respective circumferential carriage ends and a respective support member circumferentially intermediate the respective circumferential carriage ends, the support member radially supporting two of the seal arc segments, and each of the carriage arc segments includes a respective spring member on the respective support member radially biasing both of the two of the seal arc segments.

12. The gas turbine engine as recited in claim 11, wherein the segmented annular seal support includes a number X of the carriage arc segments, the segmented annular seal includes a number Y of the seal arc segments, and the number X equals the number Y.

13. The gas turbine engine as recited in claim 11, wherein each circumferential seal joint is approximately circumferentially centered between two of the circumferential carriage joints.

14. The gas turbine engine as recited in claim 11, wherein the support member supports each of the two of the seal arc segments in a respective ramped interface such that each of the two of the seal arc segments is circumferentially moveable.

15. The gas turbine engine as recited in claim 11, wherein the spring member includes first and second arms that extend in opposed circumferential directions from a central spring portion, the first arm radially biasing one of the two of the seal arc segments and the second arm radially biasing the other the two seal arc segments.

16. The gas turbine engine as recited in claim 15, wherein the central spring portion is concentric with the support member.

17. A method of assembling a seal system, the method comprising:
mounting a segmented annular seal support in a gas turbine engine, the segmented annular seal support including carriage arc segments arranged circumferentially in circumferential carriage joints; and
mounting a segmented annular seal into the engine, the segmented annular seal including seal arc segments arranged end-to-end in circumferential seal joints, wherein the mounting includes axially inserting each of the seal arc segments into the segmented annular seal support such that the circumferential seal joints are circumferentially offset from the circumferential carriage joints,
wherein each of the carriage arc segments includes respective circumferential carriage ends and a respective support member circumferentially intermediate the respective circumferential carriage ends, the support member radially supporting two of the seal arc segments, and
radially biasing both of the two of the seal arc segments using a spring on the support member.

18. The method as recited in claim 17, wherein the axial inserting includes moving each of the seal arc segments into the segmented annular seal until the seal arc segment abuts adjacent axial side walls of two of the carriage arc segments.

19. The method as recited in claim 17, wherein the mounting of the segmented annular seal support in the gas turbine engine includes hanging each of the carriage arc segments on a case structure of the gas turbine engine.

* * * * *